United States Patent [19]

Lewis

[11] Patent Number: 5,215,247
[45] Date of Patent: Jun. 1, 1993

[54] CORROSION RESISTANT INSERT

[76] Inventor: Brian M. Lewis, 4 Dunhill Crescent, Guelph, Ontario, Canada, M1H 8A4

[21] Appl. No.: 714,502

[22] Filed: Jun. 13, 1991

Related U.S. Application Data

[62] Division of Ser. No. 581,750, Sep. 13, 1990.

[51] Int. Cl.5 .............................................. B23K 31/02
[52] U.S. Cl. ...................................... 228/184; 228/215
[58] Field of Search ................................. 228/184, 215

[56] References Cited

U.S. PATENT DOCUMENTS

| | | | |
|---|---|---|---|
| Re. 28,875 | 6/1976 | Thomas | 228/184 X |
| 1,651,342 | 11/1927 | Draper | 220/258 |
| 1,939,934 | 12/1933 | Wackman | 220/258 |
| 2,024,065 | 12/1935 | Schellens | 228/184 X |
| 2,628,264 | 2/1953 | Esher | 220/258 X |
| 4,241,843 | 12/1980 | Walker | 228/184 X |
| 5,002,085 | 3/1991 | Fitzgerald | 220/89.1 X |

Primary Examiner—Richard K. Seidel
Assistant Examiner—Patty E. Hong

[57] ABSTRACT

A corrosion resistant insert of the present invention is used for fitting at an opening in a metallic liquid tank. The insert has an open end, a radially outwardly extending lip at the open end, a closed end and an axially extending side wall spacing the open end and closed ends from one another. The closed end has a displaceable portion secured to the insert in a preweakened manner which facilitates opening in one direction while resisting opening in the other direction. The use of the insert in the tank enables lining and then pressure testing of the tank ready for fittings after which the closed end of the insert is opened to allow liquid flow through the tank when the tank is in use.

3 Claims, 4 Drawing Sheets

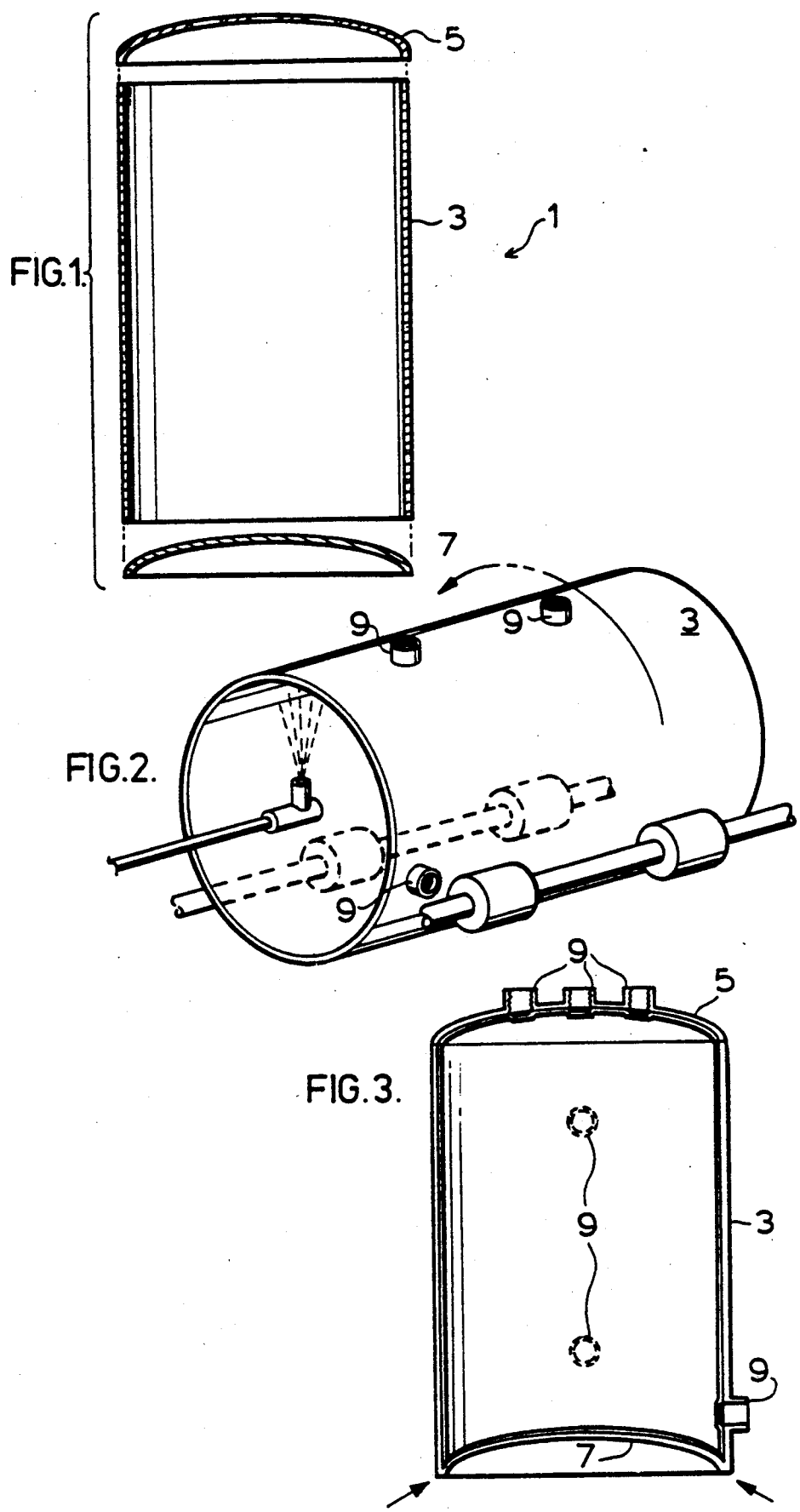

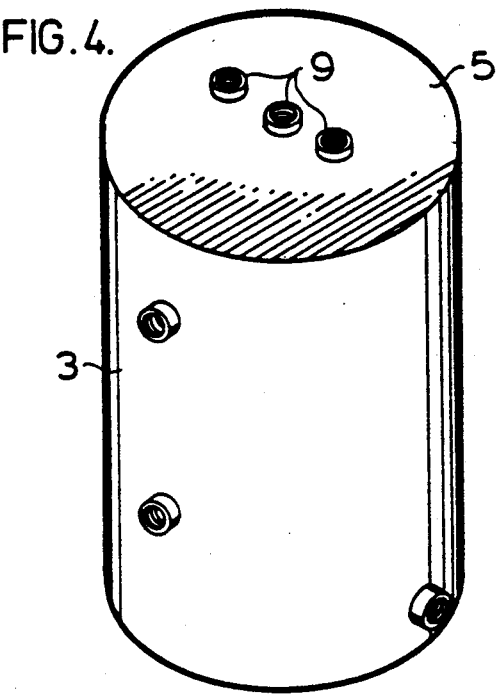
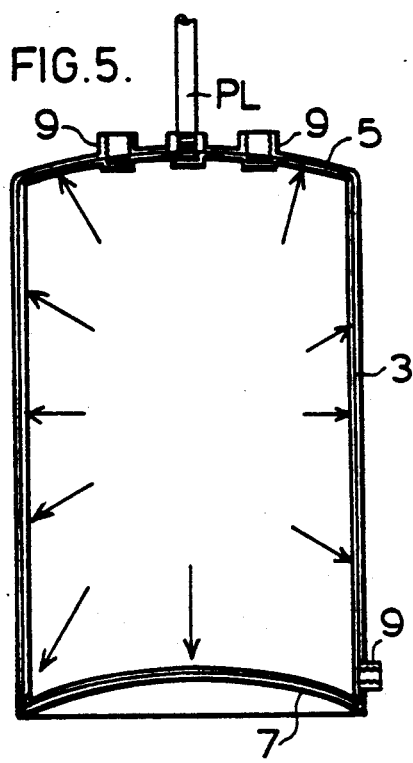
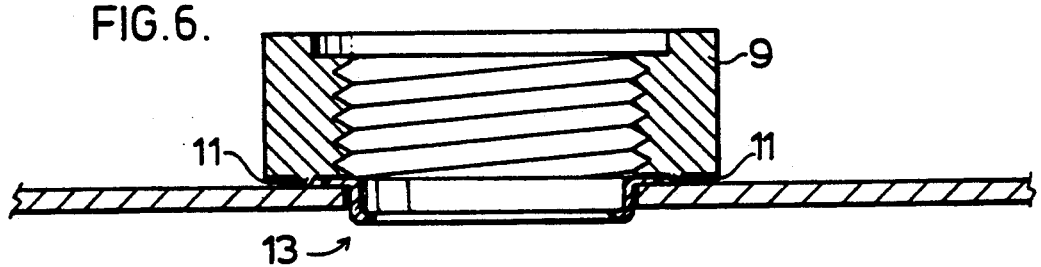
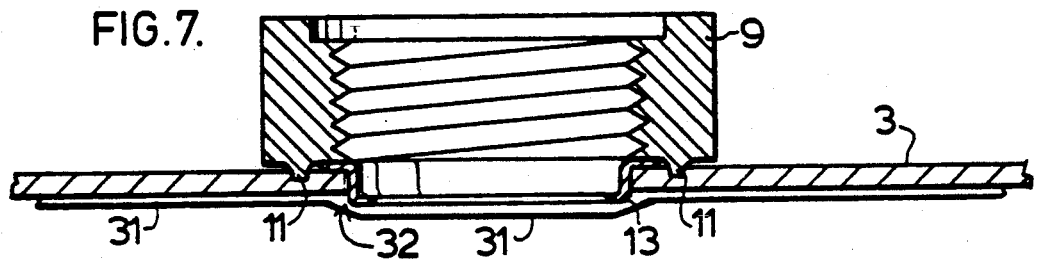

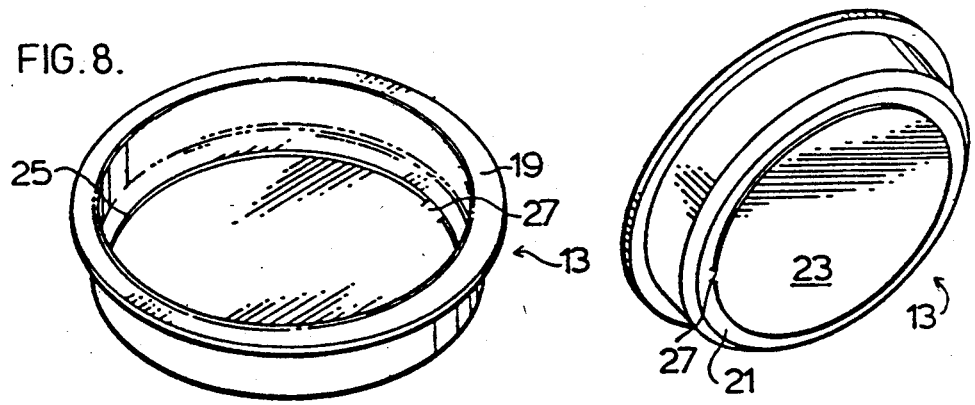
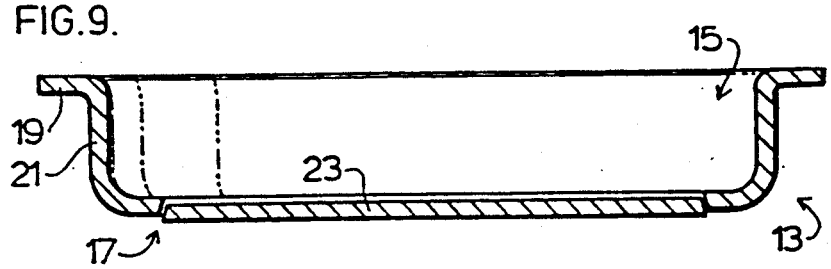
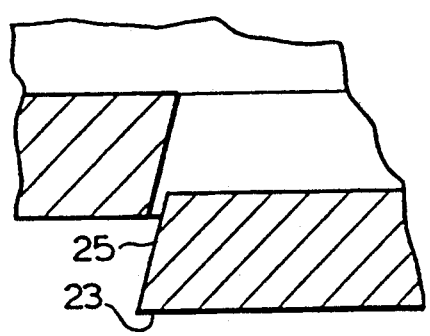
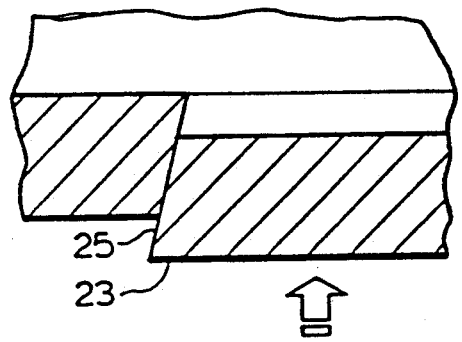
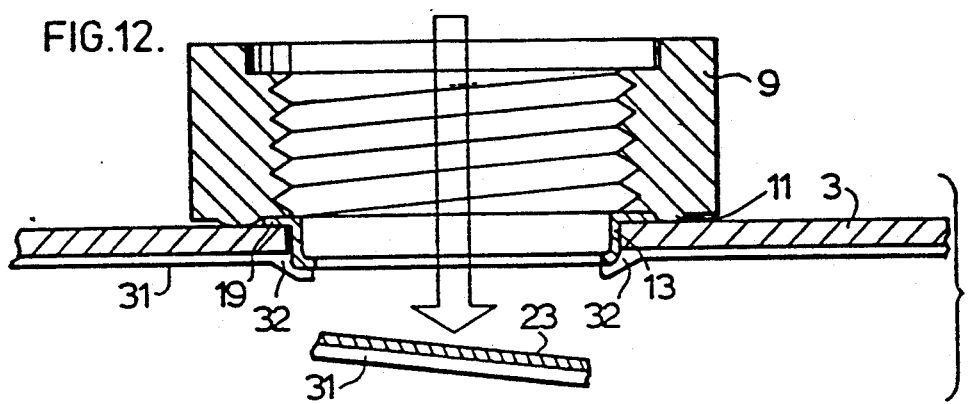

5,215,247

CORROSION RESISTANT INSERT

This is a division, of application Ser. No. 07/581,750 filed Sep. 13, 1990.

FIELD OF THE INVENTION

The present invention relates to a corrosion resistant insert for use in a metallic liquid tank and a method of preparing a liquid tank with corrosion resistant inserts for pressure testing of the liquid tank.

BACKGROUND OF THE INVENTION

Metallic water containing tanks such as water heater tanks, include tank openings with fittings supported at the tank openings. One type of a fitting support is a metal pipe nipple or spud welded to the outside of the tank. The inside of the tank is glass lined to avoid rusting caused by the liquid contained in the tank. However, with standard tank treatment techniques, the removal of the glass lining at the tank openings exposes, albeit to a very minor extent, the spud directly to the liquid contents of the tank. Accordingly, this becomes the weak spot in the tank which rusts and then eventually results in tank leakage.

As will be appreciated, water heaters are not the only type of tanks that suffer from premature rusting and leakage damage as described above.

SUMMARY OF THE PRESENT INVENTION

The present invention provides a corrosion resistant insert specifically designed to fit in the opening of a metallic liquid tank and to inhibit premature rusting at the tank opening.

More particularly, the corrosion resistant insert of the present invention has an open end, a radially outwardly extending lip at the open end, a closed end, and an axially extending sidewall spacing the open and the closed ends from one another.

The closed end has a displaceable portion secured to the insert in a preweakened manner which facilitates opening in a direction away from the open end while resisting opening of the closed end in the opposite direction.

According to a method of the present invention for preparing a metallic liquid tank having at least one wall opening, the corrosion resistant insert is fitted from the outside of the tank through the tank opening. A spud is secured as for example by welding it directly over the insert. A glass lining is then formed to the inside of the tank directly over the closed end of the insert which protrudes slightly to the inside of the tank. At this stage the tank is easily pressure tested for leakage.

Following the pressure testing the displaceable portion of the insert is easily dislodged for opening of the insert to provide a liquid flow path through both the insert and the spud. The preweakened region of the insert which is preferably in the form of a punch line substantially through the insert is formed in a manner such that the pressure inside the tank cannot push the displaceable portion out of the insert although the displaceable portion is easily dislodged in the opposite direction, i.e. from the outside into the tank.

BRIEF DESCRIPTION OF THE DRAWINGS

The above as well as other advantages and features of the present invention will be described in greater detail according to the preferred embodiments of the present invention in which;

FIG. 1 is an exploded sectional view through a standard water heater tank showing the top, the side wall and the bottom of the tank separated from one another.

FIG. 2 is a perspective view of the tank of FIG. 1 with the top welded to the side wall and with the bottom still removed for spraying an internal lining within the tank.

FIG. 3 shows the tank of FIG. 2 after spray lining and with the bottom secured to the tank.

FIG. 4 is an outside perspective view of the tank of FIG. 3.

FIG. 5 is a sectional view through the tank of FIG. 3 showing the pressure testing of the tank.

FIG. 6 is an enlarged sectional view through a spud during initial setup for securing the spud to the tank wall.

FIG. 7 is a further sectional view through the spud of FIG. 6 after the spud has been secured to the tank wall and following the internal lining of the tank.

FIG. 8 is a perspective view looking down on a tank wall insert according to a preferred embodiment of the present invention.

FIG. 8a is a bottom perspective view of the insert shown in FIG. 8.

FIG. 9 is a sectional view through the insert along the arrows shown in FIG. 8.

FIG. 10 is an enlarged sectional view showing an undercut punch line in the closed bottom of the insert of FIG. 9.

FIG. 11 shows the direction of removal of the bottom portion from the insert of FIG. 10.

FIG. 12 is a view similar to FIG. 7 showing the removal of the bottom portion from the tank wall insert.

Figure 13:
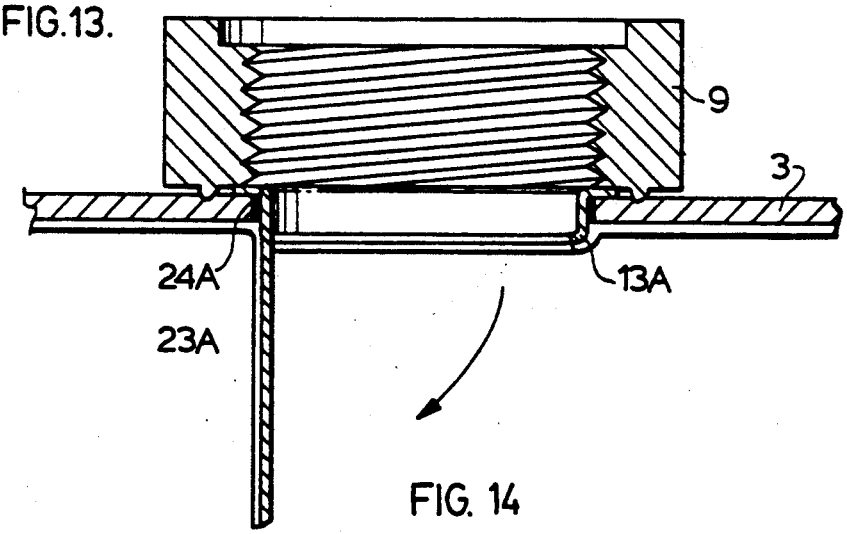
FIG. 13 shows a further preferred embodiment of the present invention similar to the arrangement shown in FIG. 12 with the exception that the bottom wall portion rather than being completely removed is simply bent away from its closed position.

DETAILED DESCRIPTION ACCORDING TO THE PREFERRED EMBODIMENTS OF THE PRESENT INVENTION

FIG. 1 shows a metallic tank and in particular a water heater tank generally indicated at 1 and formed by a side wall 3 and top and bottom walls 5 and 7 respectively which are welded to the side wall. For further purposes, the side, top and bottom walls are all generally designated as the tank wall. FIGS. 3 and 4 show tank 1 fully assembled and provided with a plurality of spuds or nipples 9 which are located directly over openings in the various tank walls. These spuds or nipples 9 are used to support fittings typically water supply pipes, to the tank.

FIG. 8 of the drawings shows the tank wall insert generally indicated at 13 and which fits directly into any one of the tank wall openings immediately beneath a spud 9 as best seen in FIGS. 6, 7 and 12 of the drawings.

Insert 13 has an inverted top hat like construction including an open end 15 and a closed end generally indicated at 17. For future reference purposes, these will be referred to as the top and bottom ends respectively of the insert, although the insert can easily be used in any direction or orientation as will be appreciated. Extending radially outwardly around the top end 15 of the insert is a lip or flange 19. Wall 21 which extends axially of the insert spaces the open top end from the closed bottom of the insert.

The insert further includes a displaceable bottom wall portion 23 which at the time of installation effectively closes off the bottom of the insert but which is held in a preweakened manner to the insert. More particularly, the insert is punched to provide a weakened region or line 25 penetrating almost but not completely through the insert. This weakened region extends most of the way around bottom portion 23 but is however interrupted by at least one small strap of unpunched or relatively unpunched material 27. This strap of material is provided as a precautionary measure in the event that the punching penetrates too deeply and line 25 is inadvertently cut completely through the insert in which case strap 27 will still hold the bottom portion with the remainder of the insert. Strap 27 is formed by simply recessing the punch at the area of the strap. It is however to be understood that strap 27 because of its very small size is readily frangible for breaking away the bottom of the insert in a manner to be described later in detail.

FIGS. 9 and 10 of the drawings show that the weakened region or line 25 is set at an upward inward angle at the bottom of the insert. As will also be described later in detail, this angling of the weakened region or line inhibits the dislodging of the displaceable bottom portion in a direction towards the top of the insert while allowing easy dislodgement of the displaceable portion in the opposite direction, i.e. downwardly away from the bottom of the insert. As will be seen in FIGS. 8a and 10 of the drawings, the displaceable portion after punching is partially pressed out from the bottom of the insert which reduces the thickness of material that has to be broken around the displaceble portion in order to dislodge it from the insert. The small strap or frangible portions are thicker than the weakened region but are so narrow that they to can easily be broken in dislodging the displaceabale portion away from its normally closed position to an open position at the bottom of the insert.

The first step in preparing the tank is to physically provide the openings in the tank wall. From here, inserts 13 which have a corrosion resistant construction, preferably of stainless steel or other similar corrosion resistant material, are fitted into the tank wall openings. The radial lip 19 of the insert engages the outside of the tank wall while the bottom end 17 of the insert extends very slightly to the inside of the tank. The insert and the tank wall opening are sized such that the insert side wall 21 is substantially snug around the tank wall opening.

From here the spud 9 is placed directly over the insert as shown in FIG. 6 of the drawings. The spud has an interior threaded opening which is aligned directly over the opening in the tank wall which to this point is closed off by insert 13. Spud 9 includes a small welding extension 11 which when the spud is welded to the tank wall melts down in a concentrated weld as shown in FIG. 7 of the drawings. Note that the radial lip 19 of the insert helps to provide a very localized and strong weld between the spud and the tank wall by preventing any inward flow of the weldable portion 11 of the spud during the welding operation.

The shell of the tank including top wall 5 which is welded to side wall 3 is then subjected to a spraying operation as shown in FIG. 2 to provide a glass lining to the inside of the tank. This is done by helically rolling the partially assembled tank around a glass spray gun which completely covers the inside of the tank with a glass lining 31. The bottom wall 7 is provided with a similar glass lining in a further method step and the bottom wall after being completed with its lining is then welded to the side wall as shown in FIG. 3 of the drawings.

At this point a fully glass lined tank has now been formed. The glass lining which is prevented during the spray operation from blowing out through the tank wall openings by the inserts forms directly over each of the inserts as best seen in FIG. 7 of the drawings. Of particular interest is the flow of the lining in the region indicated at 32 in FIGS. 7 and 12 of the drawings where the lining overlaps the minor radially inwardly extending part of the bottom wall of the insert which leaves a small lip after the displaceable portion has been removed. This completely seals off the tank wall opening and the spud from the contents of the liquid tank where the lining flows right around and onto the bottom side of the corrosion resistant tank wall insert.

The tank with the spuds already secured to the outer tank wall is now ready for pressure testing as shown in FIG. 5 of the drawings. This is done by opening one and only one of the tank wall inserts, preferably the center top insert as shown in FIG. 5, by simply applying a downward or inward pressure on the bottom portion 23 of the insert to break frangible portion 27 and easily dislodge the bottom portion of the insert to the inside of the tank. Note once again, that the undercut angling of score line 25 does not interfere with movement of the bottom portion 23 downwardly away from the insert but does interfere or wedge against displacement of the insert bottom in the opposite direction towards the outside of the tank. Therefore, neither the application of the glass lining nor the pressure applied during the pressure testing of the tank will result in dislodgement of any of the insert bottoms.

Returning to FIG. 5 of the drawings, after the one of the inserts has been opened as described immediately above, a pressure line carrying air under high pressure is fitted to the spud over that insert for introducing high pressure air to the tank. The tank is wetted in the usual pressure testing manner and if the tank leaks it is immediately apparent.

After the tank has been pressure tested and is found that there is no leakage, the remainder of the inserts at the other tank wall openings are opened in the same manner as that earlier described. The reason for opening the top center insert in the tank wall is that this provides an opening in a balanced position from which the head, i.e. the top wall, can be hung during assembly of the tank. It also allows an upward escape of moisture from inside of the tank, during the lining process.

Figure 14:
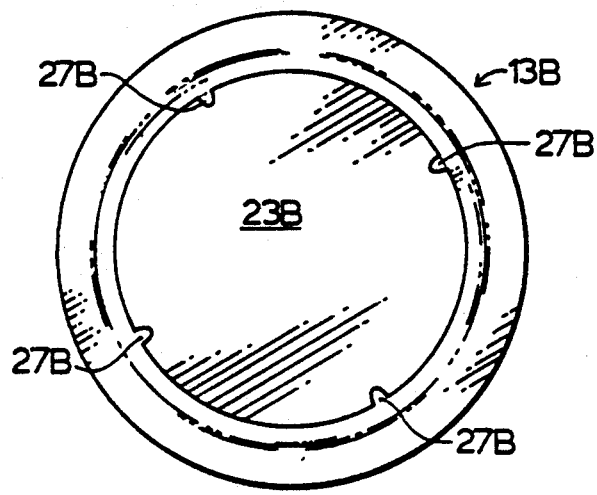
FIGS. 14 and 15 are top views of different preferred embodiment tank wall inserts from that shown in FIG. 8 of the drawings.
Figure 15:
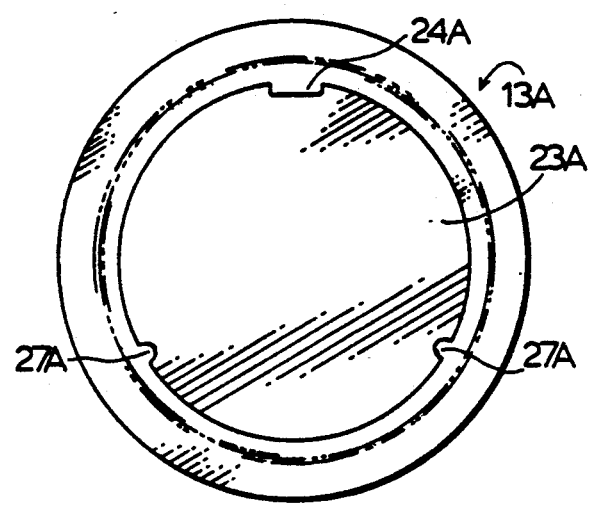

FIGS. 14 and 15 of the drawings show different preferred embodiment corrosion resistant tank wall inserts. FIG. 14 shows an insert generally indicated at 13b. This particular insert has a removable bottom portion 23b with four very small frangible strap portions 27 equidistantly spaced around the insert. This insert like the one shown in FIG. 8 allows complete removal of the bottom portion from the insert with that bottom portion falling harmlessly into the bottom of the tank. Here it is to be noted that because the insert is made of corrosion resistant material, the bottom portion which does release from the insert does not deteriorate within the tank. Furthermore, because of the upwardly convex shape of the tank bottom as shown in FIG. 3, the bottom portions of the inserts collect and remain around the edge of the tank bottom out of the way of the operation of the tank.

FIG. 15 shows a somewhat modified insert generally indicated at 13A. This insert includes a pair of frangible portions 27A which can quickly and easily be broken and allow dislodgement of the bottom portion 23A of the insert. However, this particular insert further includes in addition to the frangible portions a bendable portion 24A interrupting the weakened line around the bottom portion of the insert. With this particular arrangement, the bottom portion, rather than falling completely away from the insert, bends at the bendable portion 24A to a displaced but still connected position as shown in FIG. 13 of the drawings.

The bendable portion 24A should be sufficiently strong to hold the displaced bottom of the insert in its open position to avoid a check valve or flapper situation in which the bottom portion of the insert could possibly close and prevent flow of liquid through the tank wall opening.

The advantage provided by the FIG. 15 arrangement is that there is no "littering" of any of the insert bottoms at the bottom of the tank. However it is again to be noted that this littering does not cause any problems to the operation of the water heater for the reasons earlier given.

A number of advantages and features are provided using the corrosion resistant insert of the present invention. Of first and foremost importance is that the insert with the glass lining formed around the interior protruding edge of the insert prevents the liquid contents of the tank from escaping outwardly around the insert and gaining access to the tank wall opening thereby preventing corrosion in this area.

In addition, the inserts allow pressure testing of the tank after the spuds have been secured to the outside of the tank wall. Therefore, no further handling of the tank is required which might otherwise result in tank leakage that would only show up when used by the consumer after testing by the manufacturer.

Finally, the insert provides a very efficient weld guide to produce a much stronger localized weld at the base of the spud. This is contrasted to standard welding techniques where the spud is simply welded directly to the outside of the tank wall without any type of a corrosion resistant insert allowing the weld to flow all the way over to the tank wall opening.

Although various preferred embodiments of the invention have been described in detail, it will be appreciated by those skilled in the art that variations may be made without departing from the spirit of the invention or the scope of the appended claims.

The embodiments of the invention in which an exclusive property or privilege is claimed are defined as follows:

1. A method of preparing a metallic tank for receiving liquid in the tank, said method comprising providing a plurality of openings through said tank, securing corrosion resistant inserts at said openings, part of each insert being located to the outside of the tank and part of each insert extending to the inside of the tank, forming a displaceable portion in the part of the insert to the inside of the tank by cutting the insert in a direction which tapers downwardly outwardly into the tank thereby preweakening the insert around said displaceable portion such that said displaceable portion resists opening outwardly of said tank while being readily openable to the inside of the said tank, forming a corrosion resistant lining on the inside of the tank, said lining covering the part of each insert extending to the inside of the tank, and applying pressure from the outside of the tank to push on and open the displaceable portion of each of said inserts inwardly into the tank.

2. A method as claimed in claim 1, including welding a spud to the outside of the tank over each opening, the part of each insert located to the outside of the tank providing a weld guide for each spud.

3. A method as claimed in claim 1, including pressure testing by directing gas under pressure internally of the tank prior to opening of said inserts.

* * * * *